United States Patent [19]
Schabert et al.

[11] 3,937,651
[45] Feb. 10, 1976

[54] NUCLEAR REACTOR FACILITY

[75] Inventors: Hans-Peter Schabert, Erlangen; Johann Ropers, Grossdechsendorf, both of Germany

[73] Assignee: Siemens Aktiengesellschaft, Munich, Germany

[22] Filed: Mar. 4, 1974

[21] Appl. No.: 447,996

Related U.S. Application Data

[63] Continuation-in-part of Ser. No. 254,736, May 18, 1972, abandoned.

[30] Foreign Application Priority Data
May 21, 1971  Germany............................ 2125158

[52] U.S. Cl. ........................ 176/38; 176/65; 176/87
[51] Int. Cl. ............................................. G21c 9/00
[58] Field of Search ................... 176/37, 38, 65, 87; 165/67

[56] References Cited
UNITED STATES PATENTS

| | | | |
|---|---|---|---|
| 2,470,936 | 5/1949 | LoGerto | 165/67 |
| 3,129,836 | 4/1964 | Frevel | 176/87 |
| 3,158,546 | 11/1964 | Cordova | 176/37 |
| 3,207,671 | 9/1965 | Kornbichler | 176/38 |
| 3,470,066 | 9/1969 | Livsey et al. | 176/65 |
| 3,563,855 | 2/1971 | Marko | 176/38 |

FOREIGN PATENTS OR APPLICATIONS

| | | | |
|---|---|---|---|
| 985,307 | 3/1965 | United Kingdom | 176/38 |

*Primary Examiner*—Harvey E. Behrend
*Attorney, Agent, or Firm*—Kenyon & Kenyon Reilly Carr & Chapin

[57] ABSTRACT

A pressurized-water reactor pressure vessel connects via a main coolant pipe loop including a main coolant pump, with the lower portion of at least one vertical steam generator horizontally offset from the pressure vessel. This equipment is contained by a concrete structure entirely enclosing the pressure vessel and forming a generator room horizontally enclosing the generator and the loop and extending upwardly to an open top closed by a horizontal ceiling. The concrete structure is completely surrounded by a spherical steel containment shell designed to withstand any internal fluid pressure which might result from an accidental release of the coolant inside of this shell, and the shell forms a large space above the entire concrete structure. The ceiling above the generator room is a horizontal steel gridlike construction defining a plurality of vertical openings which are normally closed by horizontal sheet metal plates which are hinged to the gridlike construction and are light enough in weight to be forced upwardly, to open the openings, when the plates receive upward force from fluid pressure below them resulting from the loop, or other equipment in the generator room, accidentally permitting a sudden release of the pressurized-water coolant. The high fluid pressure that would otherwise develop within the concrete generator room, is in this way almost immediately relieved via the openings of the grid-like construction, by the plates being forced upwardly, the pressure being then dissipated upwardly in the large space above the top of the concrete structure, provided by the steel containment shell. This prevents the upstanding wall portions of the generator room from being stressed, and possibly damaged, by any sudden release of coolant in the generator room. Other features are disclosed.

6 Claims, 8 Drawing Figures

NUCLEAR REACTOR FACILITY

BACKGROUND OF THE INVENTION

This is a continuation-in-part of application Ser. No. 254,736 filed May 18, 1972, now abandoned.

Prior art nuclear power facilities using a pressurized-water reactor include the pressurized-water reactor pressure vessel containing the core through which the pressurized-water circulates, and a vertical steam generator adjacent to the vessel but horizontally and vertically offset from the vessel, the pressurized-water being circulated through the generator's heat-exchanger via a main pressurized-water coolant pipe loop, including a main coolant pump for coolant circulation. The loop connects the vessel with the lower part of the steam generator. Usually there is a plurality of steam generators, loops and pumps. For both biological and protective containment reasons a concrete structure completely encloses the vessel in a reactor room having a concrete ceiling with a concrete lock which is normally opened only during refueling of the reactor core in the vessel, the reactor being then shut-down.

This concrete structure also provides walls below and horizontally around the steam generator and its loop and pump, and extending upwardly and horizontally surrounding the steam generator upwardly to a level above the top of the generator where the structure forms an open top which has heretofore been closed by a heavy horizontal ceiling made of thick concrete, possibly having one or more removable sections to permit servicing of the equipment below it, but engineered and intended to completely resist and hold any fluid pressure which can accidentally develop in the enclosure, usually called a steam generator room, formed by the concrete structure below the ceiling. Such a steam generator room may contain more than one steam generator, loop and pump, and there may be more than one steam generator room in the case of the described kind of nuclear power plant.

The entire concrete structure is surrounded by a steel spherical containment shell forming a large space above the top of the concrete structure including the steam generator rooms. This shell, made of steel plates, is not designed to resist penetration by accidentally flying parts having high velocities; therefore, the concrete structure is made to include an upstanding cylindrical missile protection cylinder inside of the containment shell and forming the outer periphery or wall of the concrete structure forming the reactor and generator rooms, this cylinder extending upwardly to a level substantially above the ceilings of the generator rooms. The reactor room extends upwardly to form a space above the reactor pressure vessel's cover, for water-flooding during reactor core servicing, but the concrete ceiling of the reactor room is located at a level below the level of the tops of the steam generators; inner upstanding wall portions of the structure forming the steam generator rooms, extending upwardly to above the level of the steam generator top levels and form inner supports for the steam generator room ceilings, and, being made of thick concrete, protecting the top side of the reactor room ceiling from possible flying parts forming missiles, and from possible radiation from the upper portions of the steam generators.

The above construction provides a space above the reactor room where a core refueling machine runs on horizontal tracks from the reactor room ceiling lock to a fuel pit, and where much of the operating control equipment, condition indicating devices and the like are located. This space above the reactor room is an operating area manned by operating personel during the normal reactor operation.

All rooms within the concrete structure containing the equipment of high radiation potential, such as the reactor itself, steam generators, main cooling pipeloops and coolant pumps, are normally called equipment rooms and are inaccessible to personnel during normal reactor operation; the area outside of such rooms within the containment shell is normally termed operating area freely accessible to personnel during normal reactor operation.

The concrete missile projection cylinder is spaced inwardly from the steel containment shell to define an annualr space forming an operating area in which personnel work. They are protected by the missile cylinder from accidents in the steam generator rooms. With the latter completely closed by their concrete ceilings, an accidental coolant release in one of the rooms can possibly damage the concrete cylinder wall and other concrete generator room walls between the personnel and the accident, unless this wall is made much thicker than required to mechanically shield the steel containment shell, and the operating areas from possible flying parts.

Other than the equipment and equipment accessories, a substantial part of the cost of a reactor building is in its concrete construction. If the upstanding wall portions horizontally surrounding the steam generators and the main coolant loops and pumps can be reduced in thickness with safety, a substantial saving in material and construction costs can be achieved.

A prior art suggestion in the above direction has been to form pressure relief openings in the walls between the equipment rooms so that a pressure excess in one can equalize with the pressure in another. However, any such relief openings must be made with very small cross sectional areas to avoid material weakening of the walls, and to avoid material loss of radiation shielding. Such small openings of small area are insufficient to be consistent with the safety requirements for a nuclear building, and also to effectively permit any substantial reduction in the thickness of the generator room walls.

SUMMARY OF THE INVENTION

The object of the present invention is to decrease the material and construction costs of the steam generator room's walls in a manner consistent with absolute safety, including the safety of personel in the operating room areas of the building during all normal reactor operation, by permitting a reduction in the normal thickness of the generator room walls; an ancillary being that if these walls are made as thich as has heretofore been customary, the personnel safety factor is to be greatly increased by the invention in the event of a severe coolant loss from a coolant loop within the rooms.

According to the invention, the prior art thick and heavy concrete ceilings over the generator rooms are eliminated and replaced, in each instance, by a horizontal steel grid-like construction defining a plurality of vertical openings and forming the entire generator room ceiling. During all normal operations, all of these openings are closed by horizontal steel sheet plates positioned on the steel grid-like construction and normally closing all of its openings. These plates are made light enough in weight to be forced upwardly to fully open the openings just referred to, when the plates receive upward force from fluid pressure below them resulting from any of the equipment in the generator rooms, accidentally permitting a sudden release of the pressurized-water coolant. The openings, when open, are made large enough in cross sectional area collectively to release such a pressure substantially freely into the large space formed above the generator room ceilings formed by the containment shell, and to thereby effectively reduce the fluid pressure within the generator room where the accident occurs, and resulting from the release of the pressurized-water coolant which might then occur with great suddeness, possibly involving large volumes of coolant.

The ceiling of each generator room is thus provided with a number of steel plates or sheets each having a relatively large area presented to the pressure in the generator room below and, being of relatively light weight, they are immediately displaceable upwardly in the event of a coolant loop or other accident below them. The pressure release is positive and foolproof. Therefore, the upstanding concrete walls defining the steam generator rooms run no risk of receiving damaging forces and may be reduced in thickness with safety providing they are ample for missile protection. They are not required to resist safely the maximum hypothetical pressure that might develop in the case of a completely enclosed generator room not embodying the construction of this invention.

The outer wall of the steam generator room is formed by the concrete missile protection cylinder and this is extended to a level well above that of the new generator room ceilings. Therefore, there is no harmful loss of missile protection, the coolant loop and all of its connections being positioned at the bottoms of the steam generators where they are totally enclosed horizontally by concrete missile protection. The heat-exchanger tube bundles, in the steam generators, are not extended up to the level of the operating floor formed by the ceiling of the reactor room, the upper portions of the steam generators presenting only a small risk of possible radiation, if at all, and upstanding portions of the steam generator room walls are interposed in any event. Therefore, personnel working in the operating room or area above the reactor room are adequately protected against radiation.

During normal operations, personnel are not required to walk on the tops of the generator room ceilings. There is nothing above these ceilings excepting the space defined by the containment shell. A reactor building ordinarily includes a containment crane having rails supported by the missile protection cyclinder top periphery, and on which the containment crane runs for handling heavy parts during servicing of the steam generators, coolant pumps, etc. This containment crane does not require to be manned by personnel during normal operations.

It is this large empty space formed by the containment shell above the concrete structure, into which the pressure exhaust occurs in the event of an accident in any of the steam generator rooms. It is to be understood that in the event of such an accident the facilities' normal safety systems are automatically actuated. These normally include a building spray system operating to automatically spray water into the space above the concrete structure to reduce the concentration of fission products in the atmosphere of the containment shell and help to reduce the pressure in the entire building. To prevent the sheet steel plates from becoming missiles in the event they are actuated as described hereinabove, they are firmly hinged either pivotably or by bendable elements, to the steel grid-like construction. To permit the normal maintenance of a lower pressure in the equipment area, which includes the steam generator rooms, the plates may be sealed about the openings formed by the steel grid-like constructions. The latter are fixed to the upstanding concrete walls of the generator rooms to structurally reinforce the upper portions of these walls and to make the ceiling constructions immovable, at least horizontally. This permits the steel constructions to be used to brace the tops of the steam generators which are adjacently therebelow, using means providing substantial horizontal rigidity while permitting the necessary vertical thermal expansion and contraction of the steam generator. Such bracing has a particular advantage in that in the event a main coolant loop connection lets go a lateral thrust may be applied to the steam generator where the accident occurs, the bracing then holding the steam generator against excessive lateral displacement.

It is to be understood that the new ceilings, being a grid-like construction, and therefore fabricated from structural steel shapes riveted or interwelded, comprises the entire steam generator room ceiling in each instance. The whole ceiling is open when the steel plates or sheets are displaced when an accident occurs.

BRIEF DESCRIPTION OF THE DRAWINGS

The presently preferred mode for carrying out the invention is illustrated by the accompanying drawings, in which.

DETAILED DESCRIPTION OF THE INVENTION

Figure 1:
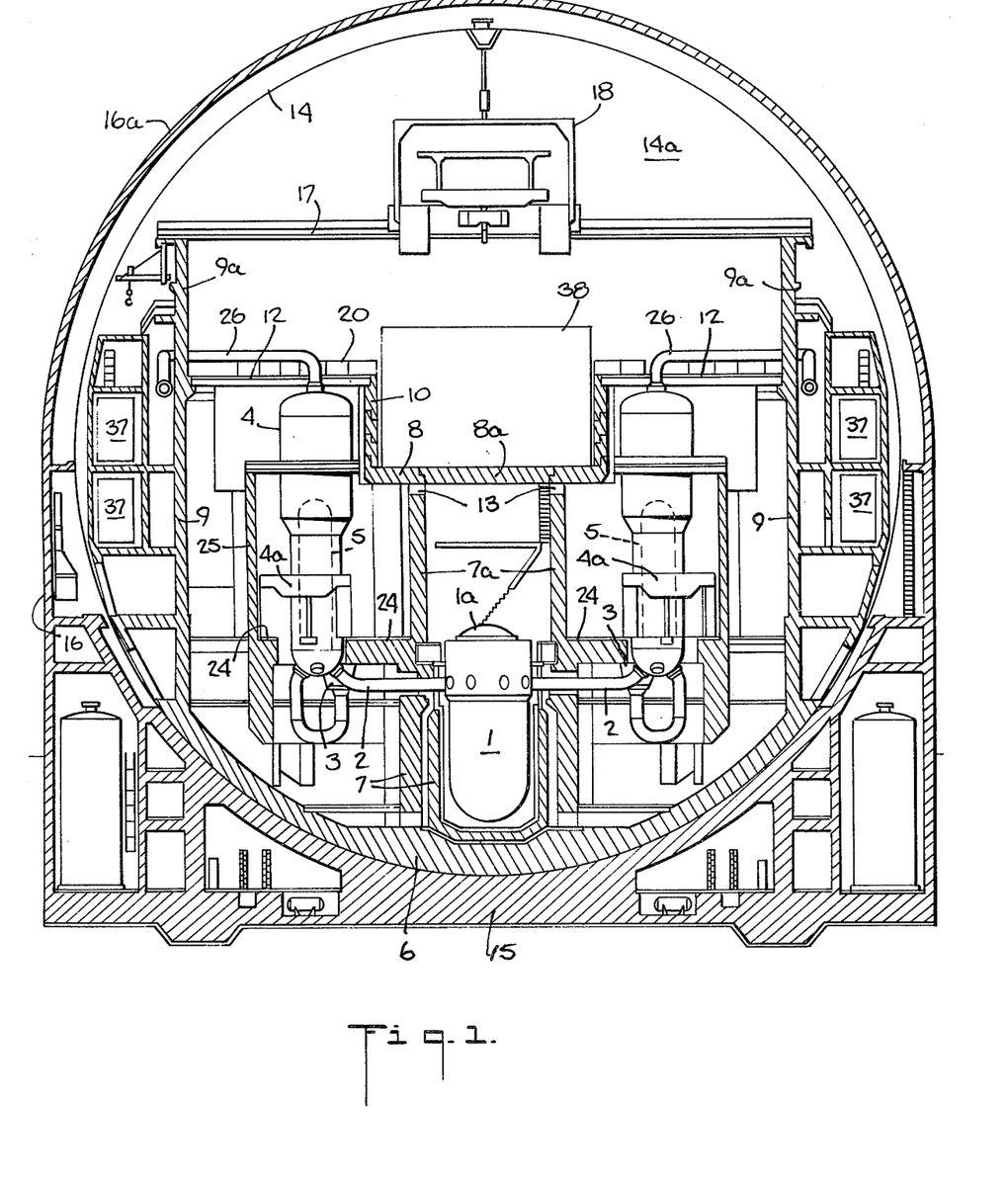
FIG. 1 is a vertical section of a reactor building taken on the line 1—1 in FIG. 2.
Figure 2:
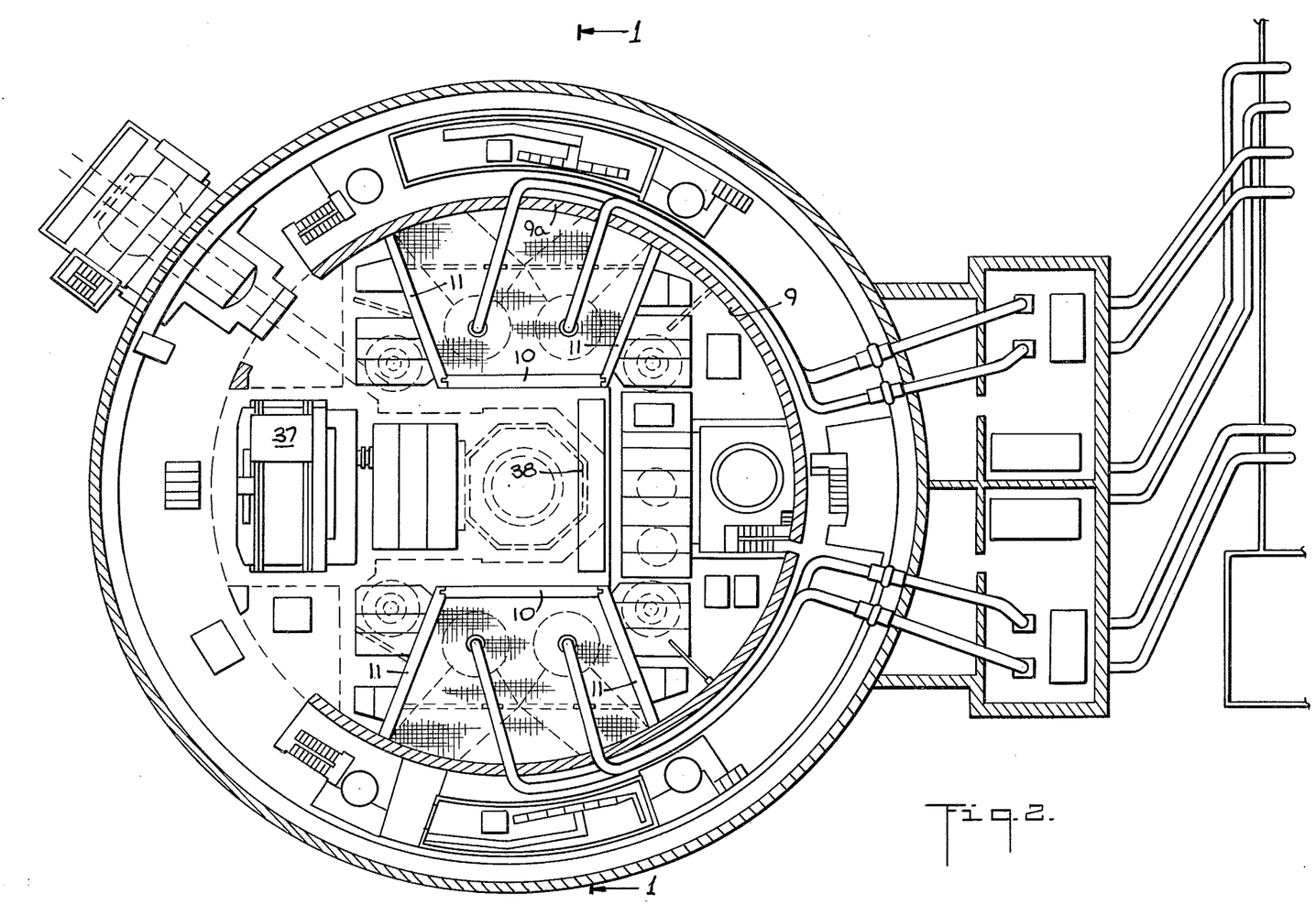
FIG. 2 is a horizontal section of the building.

Referring first to FIGS. 1 and 2, the reactor pressure vessel 1, which contains the core (not shown) cooled by the circulating pressurized-water coolant, connects via main coolant pipe loops 2 having main coolant pumps 3, with the bottom ends of the steam generators 4. These bottom ends are hemispherical and form the inlet and outlet manifolds below the tube sheets (not shown in detail) in which the inverted U-shaped tube bundles 5 are mounted via their lower ends, these heat exchangers being shown only by broken lines. The generators are horizontally and vertically offset from the vessel 1.

The above equipment, at least, is enclosed by the concrete structure. This includes a concrete semispherical bottom wall 6 extending beneath all of the equipment, including the generator loops and pumps, and having an upstanding wall portion 7 surrounding the vessel 1 and extending above its top, as at 7a, to define therewithin, the reactor room having a ceiling formed by a horizontal concrete wall 8 which includes a removable concrete reactor room lock 8a. Although not shown, control rods project through the cover 1a of the vessel 1 and during refueling or core servicing, the cover 1a is removed via the open lock 8a, the space above the vessel 1 within the wall portion 7a being water-flooded at that time to provide radiation protection.

The bottom wall 6 and the wall portions 7 and 7a provide the inside walls of the generator rooms enclosing the generators 4, the outer wall being formed by the concrete missile protection cylinder 9 which horizontally surrounds all of the equipment referred to.

This missile protection cylinder 9 extends well above the top level of the tops of the steam generators 4, as shown at 9a, and the reactor room ceiling 8 offsets or overhangs from the space defined by the wall 7a, concrete walls 10 extending upwardly from the ceiling 8 to above the level of the tops of the reactors 4. The generator rooms are enclosed in the circumferential direction of the missile cylinder 9 by interspaced walls 11 which extend aprroximately radially with respect to the axis of the missile cylinder 9, the latter being substantially or approximately concentric with the axis of the reactor pressure vessel 1.

The tops of the generator rooms defined by the walls 6, 7, 7a, 9, 10 and 11, have open tops provided with the previously described ceilings 12.

As previously noted, it has been heretofore considered necessary to make the generator room ceilings in the form of heavy concrete constructions, necessarily having removable blocks or sections to permit servicing of the equipment in the generator rooms. If one of the loops 2 lets go in any way to produce a sudden release of circulating pressurized water coolant, the generator room involved experiences a sudden substantially explosive increase in its internal pressure. As previously explained, the prior art has suggested relief openings, shown in this instance at 13 formed in the walls 7a high enough to be above the water level existing during core servicing, for the purpose of relieving the pressure in the room where the accident occurs. As previously noted, such relief openings 13 must be of small cross sectional area and, therefore, unable to provide a substantial pressure relief into the space of an adjoining room, as required to avoid high stressing of the missile cylinder 9 or the walls 11.

The entire facility, including the concrete structure and all of the equipment it contains, is enclosed by a spherical steel containment shell 14 which extends under the semispherical bottom wall 6 of the concrete construction previously described, the weight of the entire building resting on a concrete base 15, which has a semispherical concave shape for this purpose, the base construction 15 including a concrete outer wall 16 which with a concrete hemispherical top 16a, provides external missile protection for the steel containment shell 14. The latter is designed to resist the maximum fluid pressure that might develop on its interior due to even the maximum hypothetically possible accident on the part of the equipment within the concrete missile shield 9–9a. The steel containment sheel 14 forms a space 14a of very substantial or extensive area above the generator room ceilings 12 and the concrete structure in general, and which is ordinarily occupied only by the rails 17 of the containment crane 18 which is used to remove the concrete lock 8a and the reactor vessel's cover 1a during servicing of the reactor 1 when the latter is shut down. The containment crane 18 may also be used in conjunction with equipment servicing in the steam generator rooms.

The operating area or rooms are formed outside of the cylinder 9, 9a, the walls 10 and 11 and above the ceiling 8 having its top side protected by the walls 10. The top ends of the heat exchangers 5 of the generators 4 terminate at a level below that of the floor provided by the top side or upper surface of the reactor room ceiling 8–8a.

It has been found that there is no harmful radiation upwardly at the ceilings 12, that extends to the operating area within the walls 10 above the floor 8–8a, even if the generator room ceiling does not function as biological shielding.

Figure 3:
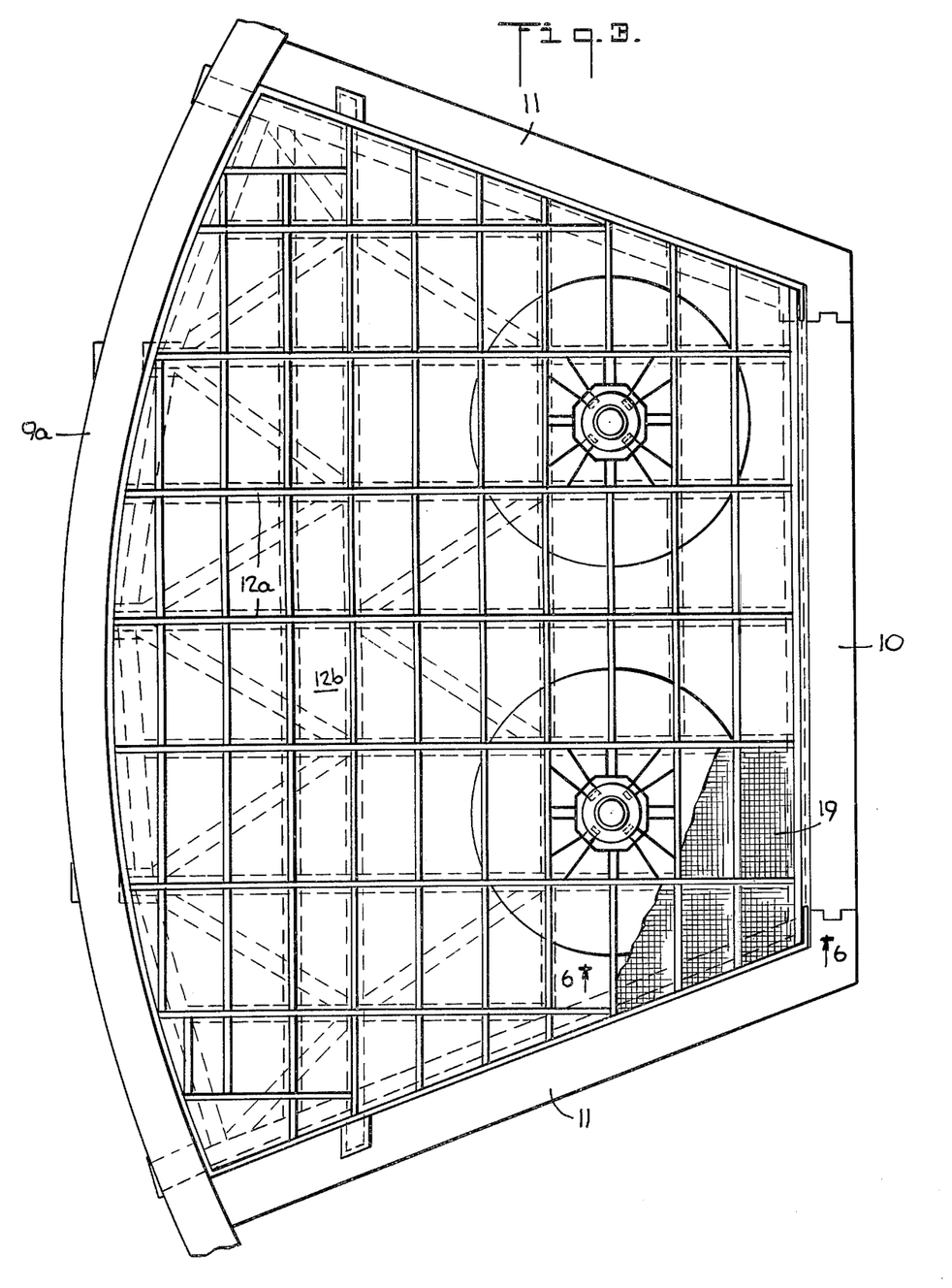
FIG. 3 on an enlarged scale is a plan view looking down on one of the reactor rooms and showing the steel grid-like ceiling construction.
Figure 4:
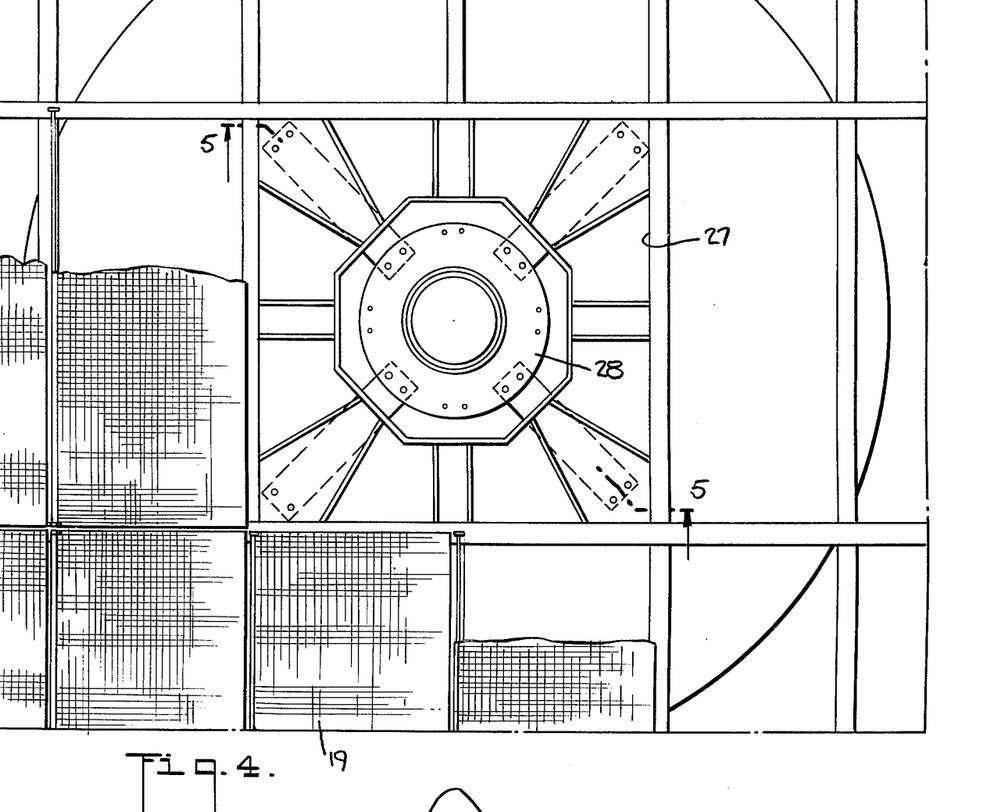
FIG. 4 on a still further enlarged scale shows the manner in which the grid-like construction braces the top of one of the steam generators.
Figure 5:
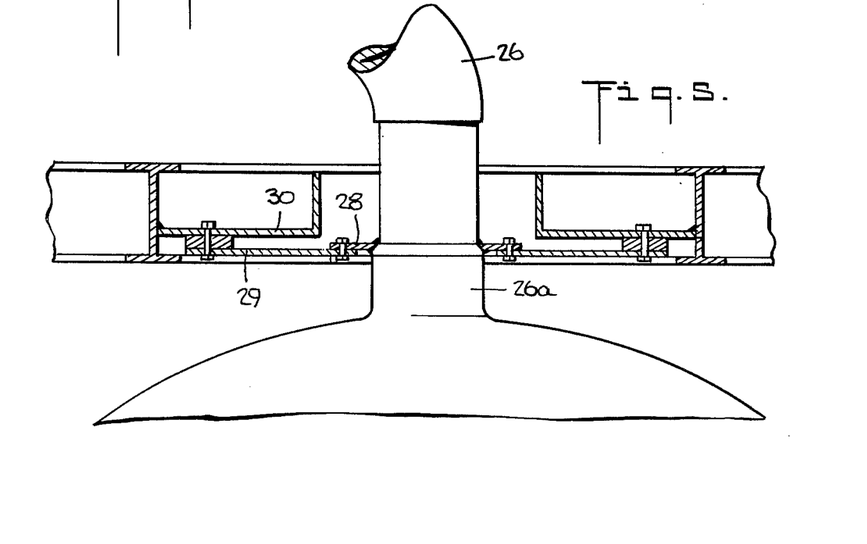
FIG. 5 is a vertical section taken on the line 5—5 in FIG. 4.

According to the invention, each ceiling 12 is formed by the steel grid-like construction shown by FIGS. 3 through 5. This construction is formed from structural steel shapes 12a of suitable lengths, which are interwelded together or riveted together. Standard structural steel engineering principals may be used to form a strong open grid. This construction is anchored or connected with the upstanding portion 9a of the concrete missile protection cylinder, to the substantially radially extending walls 11 of the generator room, and to the top of upstanding wall 10, as shown by FIG. 3 in particular.

The generator room ceiling provided by this grid of structural steel webs can be made strong enough to provide supports for the various walls by interconnecting them. It can be made removable to permit servicing of the equipment in the steam generator rooms below. This grid-like construction is shown anchored to the walls previously mentioned, so that it is held stationary in a horizontal direction, at least. Preferably it should be strong enough to form a floor so that during servicing of the reactor the heavy concrete lock 8a can be lifted and placed on the ceiling construction provided by the structural shapes 12a, so that it is out of the way during servicing of the reactor components. It should also be able to withstand the weight of the reactor pressure vessel cover 1a so that the latter can be stored in an out of the way position during installation of the reactor. These heavy parts are, of course, handled by the containment crane 18; at such times the reactor is in a shut-down condition.

The structural steel shapes 12a define a multiplicity of vertical openings 12b which when open collectively provide an area large enough to release even the maximum pressure that might be potentially possible inside of the generator rooms, into the large space 14a above, so as to effectively reduce the fluid pressure within the structure defining the generator room where an accident occurs resulting in release of the pressurized-water coolant. Although not shown, all reactor buildings normally include a spray system which in the event of such an accident, sprays water into the space 14a as previously described.

During normal reactor operation, and with normal operation of the steam generators, all of the openings 12b are covered by solid or imperforate sheet steel plates 19. These plates are freely displaceable upwardly and are light enough in weight to be displaced upwardly substantially immediately upon the development of an excessive fluid pressure in either of the generator rooms. At the same time, the plates may be thick enough, or heavy enough in gauge, to be strong enough to permit personnel to walk upon them, the tops of the walls 11 being shown as provided with handrails 20 to restrain personnel from inadvertently falling off of what are in effect raised platforms.

Figure 6:
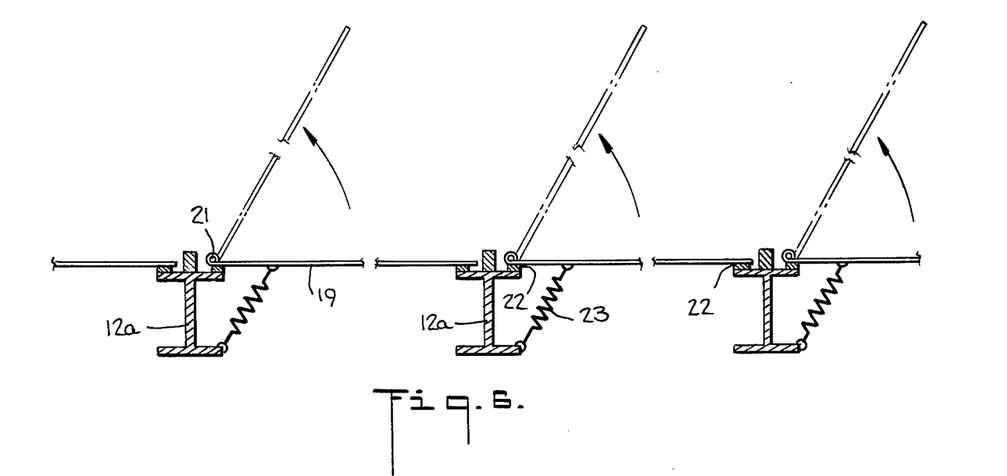
FIG. 6 in detail in vertical section shows the steel plates or sheets and the manner in which they open when required to operate.

To prevent the steel plates 19 from becoming missiles, they are each hinged along one side as at 21 in FIG. 6, to the structural steel shapes 12a. Any suitable hinging arrangement may be used including bolts proportioned to be adequately bendable to permit the upward displacement of the steel plates should this become necessary. Also, as was indicated by FIG. 6, the peripheries of the steel plates may be provided with seals 22 against which the plates seal fluid-tightly, springs 23 being shown in FIG. 6 to keep the plates seated on these seals but without interfering with their displaceability permitting them to perform their intended function of immediately opening to immediately release the pressure in the generator room below them when required. The use of such seals permits the normal maintenance of a lower pressure in the equipment rooms, including the generator rooms, than exists in the operating area or rooms which is accessible to personnel during normal operation of the equipment. This is done to assure against the escape of possibly harmful gases from the equipment rooms into the personnel rooms or area, during normal operation of the facility.

The concrete construction provides horizontal walls 24 extending over most of the coolant pipeline loops 2 so as to prevent upward radiation from the circulating coolant within the loops 2. The concrete construction also forms upstanding walls 25 between the generators and the missile cylinder 9, thus providing additional biological protection against radiation in the horizontal direction. These walls 25 extend above the level of the tops of the heat exchangers 5 which carry coolant. The horizontal floors 24 also serve to support the steam generators via supporting structures 4a.

In the event of a break in a connection between the pipeline loop 2 and one of the steam generators, the generator may receive a large horizontally directed force tending to tilt it or otherwise displace it, worsening the inherent damage that then occurs. To prevent this, advantage is taken of the very strong structural steel ceilings over the generator rooms. As shown by FIGS. 1 through 5, the steam generators are of the type having steam domes from the centers of the tops of which the steam power outputs are delivered via the steamoutput pipes 26. These pipes extend upwardly through the ceilings 12 via openings 27 in the grids, shown in FIG. 4 and 5. The steel cover plates 19 are shown removed from one of the openings 27 as shown in FIGS. 4 and 5, but it is to be understood that these openings also may be normally closed and sealed by plates which fit closely around the upstanding portions of the steam pipes 26. However, because these openings 27 are small in relation to the overall area of the ceilings 12, they can be left open, relying on the ventilation systems to maintain the normal under-pressure in the equipment rooms. The pipes 26, of course, carry steam entirely separated from the coolant and which is free from any radiation hazard.

Using the structural strength of the new ceilings 12, each generator has its connection 26a with its output pipe 26 provided with a welded steel flat annulus 28 to which four symmetrically radiating flat steel plates or arms 29 are removably bolted, the outer ends of these plates being removably bolted to supporting steel box structures 30 rigidly secured as by welding, to the structural steel grid or frame of the generator room ceiling in each instance. These plates or arms 29 are vertically flexible to permit vertical expansion and contraction of the steam generator involved but are rigid in the radial directions of the parts 28. Therefore, in the event of an accident of the type described hereinabove the top of the steam generator involved is rigidly held to prevent lateral displacement of the top of the steam generator or tilting of the steam generator. This kind of generator bracing cannot be provided by the prior art concrete ceiling constructions.

Figure 7:
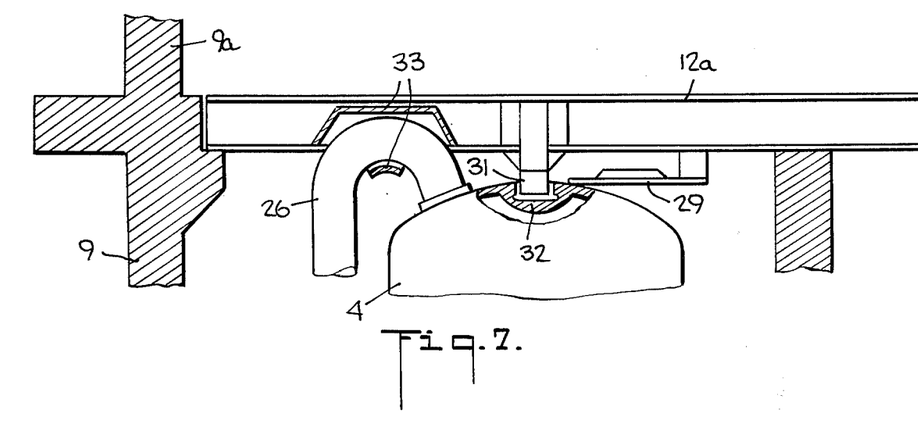
FIG. 7 is a vertical section showing the top of one of the steam generators and a modification of the manner in which it is braced by the steel ceiling construction.

A suggestive modification of the above is shown by FIG. 7 as being a possibility in the case of a steam generator having its steam output offset from the axis of its steam dome. In this instance, in addition to the support plates 29, or their equivalent, the structural steel members 12a rigidly providing a downward depending post 31 which removably fits in a recess 32 formed in the top of the steam generator, the recess 32 providing a space all around the post 21, including its bottom, permitting normal thermal motion of the steam generator 4 with the post 31 rigidly restraining any excessive lateral displacement of the steam generator top. Here the steam output pipe 26a is shown as curving so as to be below the upper level of the top of the grid-like structure shown at 12a, thermal shielding 33 reducing the heat that might otherwise be transmitted to the steel plates 19. However, in the case of the FIG. 1 arrangement, it is to be understood that the steam pipes 26 would normally be heavily thermally insulated as is the custom in any steam transmission line.

Figure 8:
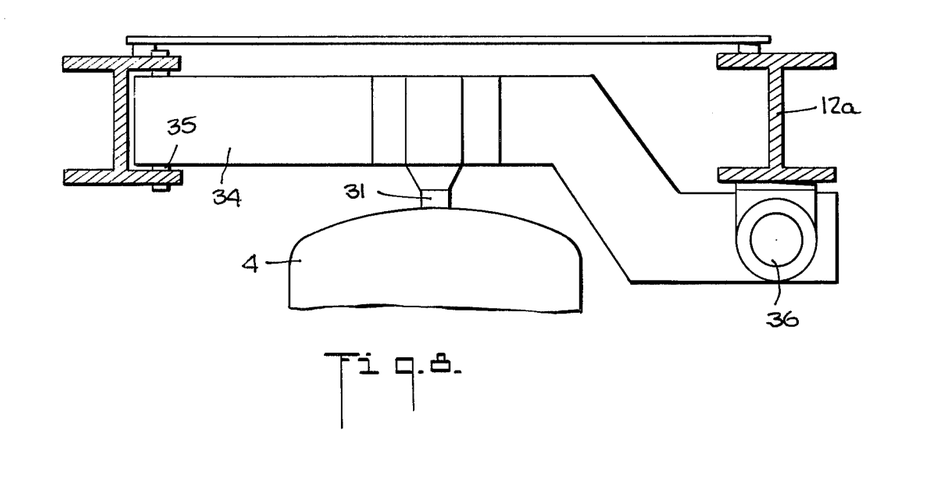
FIG. 8 is like FIG. 7 but shows another modification.

FIG. 8 shows another modification having the post 21 of FIG. 7 connecting with the top of the steam generator 4 but in this instance mounted by a horizontal arm 34 pivoted at 35 to one of the structural steam shapes. The arm 34 extends to the next adjacent shape 12a to which it is anchored via a horizontal shock absorber 26 permitting the arm 34 to swing horizontally but under the restraint of the shock absorber, the latter being, for example, of the cylindrical and piston type with the cylinder confining a gas or possibly a liquid which can be expelled at a controlled rate via a suitable orifice (not shown). The direction of swing of the arm 34 should be in the direction in which the top of the steam generator 4 would be expected to be displaced in the event of a disconnection from the pipe loop connecting with its lower portion, particularly the section of the loop containing the higher coolant pressure.

The operating room defined above the reactor room ceiling 8–8a, normally includes the rails (not shown) on which the refueling machine 27, shown in FIG. 2, operates, and contains a cntrol and instrument panel 38. This room is accessible during operation of the reactor. It is biologically well shielded in the usual manner by the ceiling 8–8a and the walls 10, in the horizontal direction. Because of the space above the coolant loops 2 and their main coolant pumps 3, and above the tops of the heat exchangers 5, and the vertical biological shielding of the concrete wall 24, personnel in this operating room are not subject to any greater radiation hazard than when if heavy concrete ceilings were to be used over the generator rooms. All space that was considered to be operating area and available for use by personnel during the operation of the reactor, when the concrete ceilings were used, remains equally available with equal safety. The normal atmospheric underpressure in the equipment area or rooms can be maintained.

Because the invention drastically reduces the stress the missle cylinder wall portion 9 must ever carry, this wall portion, and of course, the portion 9a, may be reduced in thickness safely, as indicated by FIG. 1. There is no risk of damage to this wall portion 9 in the event of a generator room loss-of-coolant accident, and personnel in the operating rooms, indicated at 37, between the wall portion 9 and the containment shell 14, remain protected even if this missile cylinder has a wall of reduced thickness. Any reduction this might make in biological protection is compensated for by the wall 25. The latter may be made to surround both generators in each generator room, so the walls 11 may also be reduced in thickness.

This invention eliminates or substantially reduces the risk that a steam generator room accident might result in serious damage to a major portion of the facility.

What is claimed is:

1. A nuclear power facility comprising a pressurized-water reactor pressure vessel, at least one vertical steam generator horizontally offset from said vessel, a main pressurized-water coolant pipe loop interconnecting said pressure vessel and a lower portion of said steam generator, said loop containing circulating pressurized-water coolant, a concrete structure forming a steam generator and loop and extending upwardly and horizontally surrounding said steam generator and at least a substantial portion of said loop to a height above said steam generator and having an open top above said steam generator, said concrete structure forming at least one operating room separated from said steam generator room by one of said walls extending upwardly, accidental release of said coolant from said loop forming vapor having a vapor pressure, a horizontal ceiling above said steam generator and closing said top so that said release causes said steam generator room to be pressurized under said vapor pressure, and a containment shell enclosing said structure including said rooms and forming a space of substantial area above said steam generator room, said ceiling being a metal ceiling formed by a metal grid-like construction defining a plurality of vertical openings and having horizontal sheet metal plates positioned on said construction and normally closing said openings, said plates being strong enough for personnel to walk upon but light enough in weight to be displaced upwardly to open said openings when the plates receive upward force from said vapor pressure in said steam generator room resulting from said loop accidentally permitting a release of said pressurized-water coolant, said opening when open being large enough in cross-sectional area collectively, to release said vapor pressure into said space to a degree substantially reducing said vapor pressure within said steam generator room and on said one of said walls extending upwardly and separating said equipment room from said steam generator room, and connecting means for connecting said plates to said metal grid-like construction and holding the plates against complete separation therefrom when forced upwardly by said fluid vapor pressure, said connecting means permitting said plates to swing upwardly when displaced to open said openings, said metal grid-like construction connecting with said open top of said concrete structure and being held thereby against horizontal displacement, and said generator having a top portion adjacently below said construction and means for connecting said top portion with said construction to restrain said top portion from horizontal displacement while permitting vertical movement of said top portion.

2. The facility of claim 1 having means for releasably sealing said plates so they substantially gas-tightly normally close said openings to a degree permitting a gas pressure-differential to be maintained above and below said metal ceiling.

3. The facility of claim 1 in which said concrete structure forms walls enclosing said reactor pressure vessel in all directions and includes a horizontal concrete ceiling spaced above said vessel, said open top closed by said metal ceiling being horizontally and upwardly offset from said concrete ceiling, said horizontal concrete ceiling having a top side forming an operating floor on which personnel may work, said steam generator having an upper portion extending above said floor, and said concrete structure having a portion forming an upstanding concrete wall extending above said floor and connected with the latter and shielding said floor from said steam generator.

4. The facility of claim 1 in which said concrete structure forms a horizontal wall adjacently above at least a substantial portion of said pressurized-water coolant loop.

5. The facility of claim 1 in which said concrete structure forms a missile protection cylinder inside of said containment shell and horizontally encircling said steam generator and coolant loop and extending vertically for a substantial distance above said metal ceiling and into said space.

6. The facility of claim 5 having means for hinging said plates to said construction for holding the plates against becoming missiles when forced upwardly by said fluid pressure.

* * * * *

UNITED STATES PATENT AND TRADEMARK OFFICE
CERTIFICATE OF CORRECTION

PATENT NO. : 3 937 651
DATED : February 10, 1976
INVENTOR(S) : Hans-Peter Schabert et al It is certified that error appears in the above-identified patent and that said Letters Patent are hereby corrected as shown below:

In Column 2, line 4, change "personel" to --personnel--

In Column 2, line 15, change "projection" to --protection--

In Column 2, line 17, change "annualr" to --annular--

In Column 2, line 51, change "personel" to --personnel--

In Column 2, line 55, change "thich" to --thick--

In Column 6, line 10, change "conjunction" to --connection--

In Column 6, line 29, change "principals to --principles--

In Column 8, line 59, change "cntrl" to --control--

In Column 9, line 9, change "missle" to --missile--

In Claim 1, between lines 32 and 33 insert the following words: --a concrete structure forming a steam generator room having walls extending below said--

Signed and Sealed this

Twenty-fourth Day of August 1976

[SEAL]

Attest:

RUTH C. MASON
Attesting Officer

C. MARSHALL DANN
Commissioner of Patents and Trademarks